United States Patent
Koyande et al.

(10) Patent No.: US 12,345,186 B2
(45) Date of Patent: Jul. 1, 2025

(54) EXHAUST STRUCTURE FOR ENGINE

(71) Applicant: KAWASAKI MOTORS, LTD., Hyogo (JP)

(72) Inventors: Kunal Shamsundar Koyande, Pune (IN); Hisatoyo Arima, Hyogo (JP); Kozo Suzuki, Hyogo (JP); Yasuhiko Kanatake, Hyogo (JP); Hiroshi Kato, Hyogo (JP); Akio Fujiki, Hyogo (JP); Tomoyuki Takeshita, Hyogo (JP); Kazuki Aizawa, Hyogo (JP)

(73) Assignee: KAWASAKI MOTORS, LTD., Hyogo (JP)

( * ) Notice: Subject to any disclaimer, the term of this patent is extended or adjusted under 35 U.S.C. 154(b) by 207 days.

(21) Appl. No.: 18/091,561

(22) Filed: Dec. 30, 2022

(65) Prior Publication Data

US 2023/0134048 A1    May 4, 2023

Related U.S. Application Data

(63) Continuation of application No. PCT/JP2022/008509, filed on Mar. 1, 2022.

(30) Foreign Application Priority Data

Mar. 8, 2021 (IN) .............................. 202111009610

(51) Int. Cl.
*F01N 13/00* (2010.01)
*F01N 13/08* (2010.01)

(52) U.S. Cl.
CPC ............. *F01N 13/00* (2013.01); *F01N 13/08* (2013.01); *F01N 2470/08* (2013.01); *F01N 2470/22* (2013.01); *F01N 2590/04* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,094,644 | A * | 6/1978 | Wagner | F01N 1/08 422/181 |
| 5,151,254 | A * | 9/1992 | Arai | F01N 3/2807 60/299 |
| 6,394,225 | B1* | 5/2002 | Yasuda | F01N 1/084 181/282 |
| 9,498,750 | B2 | 11/2016 | Nagata et al. | |
| 2009/0000282 | A1* | 1/2009 | Gruber | F01N 1/02 181/227 |
| 2009/0000862 | A1* | 1/2009 | Buell | F01N 13/1805 181/212 |

(Continued)

FOREIGN PATENT DOCUMENTS

| | | |
|---|---|---|
| JP | 2001-271628 | 10/2001 |
| JP | 2006-207571 | 8/2006 |
| JP | 2013-133738 | 7/2013 |

*Primary Examiner* — Binh Q Tran
(74) *Attorney, Agent, or Firm* — Greenblum & Bernstein, P.L.C.

(57) ABSTRACT

An exhaust structure for an engine includes: a catalyst converter configured to purify exhaust gas of the engine; a catalyst pipe in which the catalyst converter is accommodated; and a lead-out pipe configured to lead the exhaust gas to the catalyst pipe. The lead-out pipe is closed at a downstream end thereof, and has a plurality of discharge holes formed in a peripheral wall thereof.

9 Claims, 6 Drawing Sheets

(56) References Cited

U.S. PATENT DOCUMENTS

| | | | |
|---|---|---|---|
| 2013/0075192 A1* | 3/2013 | Hayama | F01N 3/2885 181/228 |
| 2014/0116796 A1* | 5/2014 | Poulin | F01N 13/08 60/281 |
| 2014/0348715 A1 | 11/2014 | Nagata et al. | |
| 2019/0055866 A1* | 2/2019 | Kishikawa | F01N 3/2882 |

* cited by examiner

EXHAUST STRUCTURE FOR ENGINE

CROSS REFERENCE TO THE RELATED APPLICATION

This application is a continuation application, under 35 U.S.C. § 111(a) of international patent application No. PCT/JP2022/008509, filed Mar. 1, 2022, which claims priority to Indian patent application No. 202111009610, filed Mar. 8, 2021, the entire disclosures of all of which are herein incorporated by reference as a part of this application.

BACKGROUND OF THE INVENTION

Field of the Invention

The present invention relates to an exhaust structure including a catalyst converter that purifies exhaust gas of an engine.

Description of Related Art

An exhaust structure for an engine has been known in which a catalyst converter for purifying exhaust gas is provided on an exhaust passage (for example, Patent Document 1).

RELATED DOCUMENT

Patent Document

[Patent Document 1] JP Laid-open Patent Publication No. 2006-207571

In order to maintain the exhaust purification performance, it is desirable to prevent deterioration of the catalyst converter.

SUMMARY OF THE INVENTION

An object of the present invention is to provide an exhaust structure for an engine capable of preventing deterioration of a catalyst converter.

In order to achieve the above-described object, an exhaust structure for an engine according to the present invention is an exhaust structure including: a catalyst converter configured to purify exhaust gas of an engine; a catalyst pipe in which the catalyst converter is accommodated; and a lead-out pipe configured to lead the exhaust gas to the catalyst pipe, wherein the lead-out pipe is closed at a downstream end thereof, and has a plurality of discharge holes formed in a peripheral wall thereof.

In this configuration, the exhaust gas is discharged from the plurality of discharge holes formed in the peripheral wall of the lead-out pipe, and is introduced to the catalyst pipe. Accordingly, the exhaust gas can be prevented from being concentrated on a specific part of the catalyst converter. As a result, deterioration and damage of a specific part of the catalyst converter can be prevented. In addition, since the exhaust gas is introduced to the entire upstream end of the catalyst converter, and not to a specific part of the upstream end of the catalyst converter, the exhaust gas can be efficiently purified. As a result, for example, the amount of a catalyst retained can be reduced.

In the present invention, the discharge holes may be formed over an entire region in a circumferential direction of the peripheral wall. In this configuration, since the exhaust gas is discharged toward the radial direction of the lead-out pipe from the entire region in the circumferential direction, uneven distribution of the exhaust gas in the circumferential direction can be prevented. Accordingly, the exhaust gas can be efficiently purified.

In the present invention, an axis of the lead-out pipe may be inclined relative to an axis of the catalyst pipe. In this configuration, the exhaust gas can be brought into contact with a wider area of the upstream end surface of the catalyst converter. As a result, the exhaust gas can be efficiently purified.

In the present invention, a curved portion may be provided in the lead-out pipe or a pipe upstream of the lead-out pipe, and an opening area of the discharge holes on an outer side of curve may be set so as to be smaller than an opening area of the discharge holes on an inner side of curve. In this configuration, even in the case where the exhaust passage is curved due to the layout need of the exhaust passage, uneven distribution of the exhaust gas due to the curve can be inhibited. As a result, the exhaust gas can be efficiently purified.

In the present invention, an inner diameter of the cylindrical catalyst pipe may be set so as to be larger than an inner diameter of the lead-out pipe. In this configuration, the purification performance of the catalyst converter can be enhanced by increasing the size of the catalyst converter, and the exhaust gas can also be dispersed by the discharge holes formed in the peripheral wall of the lead-out pipe, thereby efficiently using the catalyst converter.

In the present invention, a sum of opening areas of the discharge holes may be set so as to be larger than a closed outlet area of the lead-out pipe. In this configuration, since the sufficiently large opening area of the discharge holes can be ensured, a sufficient amount of the exhaust gas is discharged from the discharge holes, and the flow of the exhaust gas is not obstructed. Accordingly, a decrease in engine output can be prevented.

In the present invention, the engine may be a single-cylinder engine. When compared assuming that the amount of exhaust gas is the same, the single-cylinder engine has a larger exhaust pressure discharged from one cylinder than a multi-cylinder engine. However, in this configuration, since the exhaust gas is dispersed by the discharge holes, deterioration and damage of a specific part of the catalyst converter can be prevented.

A saddle riding vehicle of the present invention includes the exhaust structure for the engine of the present invention, an exhaust pipe is connected to a front surface of the engine, and the lead-out pipe is disposed in front of the engine. In this configuration, since the lead-out pipe is located at the upstream portion in the exhaust passage, the exhaust pressure is rendered to be large. However, since the exhaust gas is dispersed by the discharge holes, deterioration and damage of a specific part of the catalyst converter can be prevented.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

Hereinafter, a preferred embodiment of the present invention will be described with reference to the drawings. As used herein, the terms "right" and "left" refer to "right" and "left" as seen from a driver on a vehicle. In addition, the terms "front" and "rear" refer to "front" and "rear" in the travelling direction of the vehicle. Moreover, the terms "upstream" and "downstream" refer to "upstream" and "downstream" in a flow direction of exhaust gas.

Figure 1:
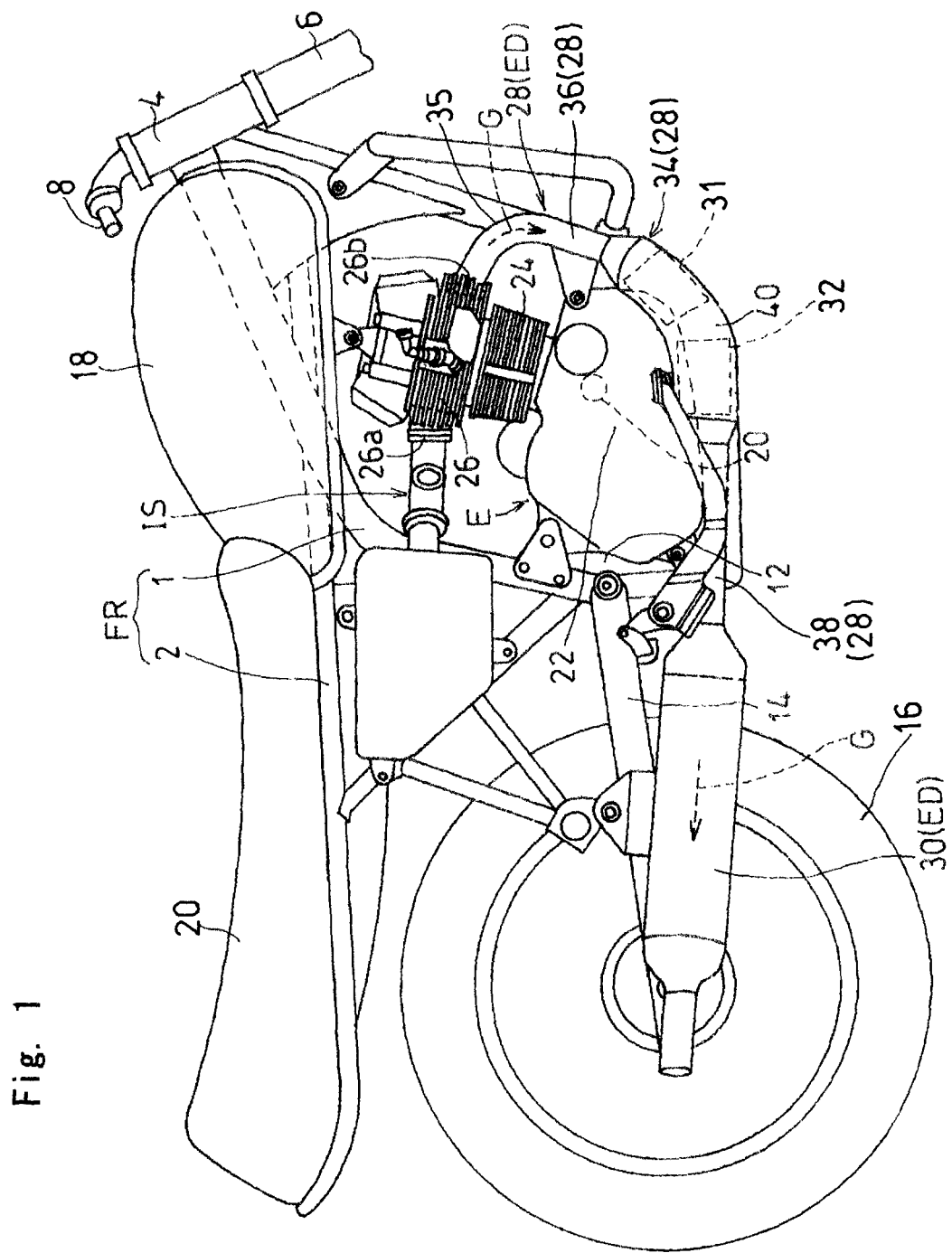
FIG. 1 is a side view showing a motorcycle which is a type of saddle riding vehicle including an exhaust structure for an engine according to a first embodiment of the present invention.

FIG. 1 is a side view showing a motorcycle which is a type of saddle riding vehicle including an exhaust structure for an engine according to a first embodiment of the present invention. A motorcycle frame structure FR of the motorcycle of the present embodiment includes a main frame 1 which forms a front half of the motorcycle frame structure FR, and a rear frame 2 which forms a rear half of the motorcycle frame structure FR. The main frame 1 extends rearward and obliquely downward from a head pipe 4 at the front end thereof, bends downward, and extends in the up-down direction or vertical direction. The rear frame 2 extends rearward from a rear portion of the main frame 1.

A front fork 6 is supported by the head pipe 4 via a steering shaft (not shown), and a front wheel (not shown) is supported by a lower end portion of the front fork 6. A steering handle 8 is mounted on an upper end portion of the front fork 6.

A swing arm bracket 12 is provided at a rear end portion of the main frame 1. A swing arm 14 is supported by the swing arm bracket 12 for swing movement in the vertical direction. A rear wheel 16 is mounted on a rear end portion of the swing arm 14.

An engine E, which is a drive source of the motorcycle, is mounted below the main frame 1 and in front of the swing arm bracket 12. The rear wheel 16 is driven by the engine E via a power transmission member (not shown) such as a chain. A fuel tank 18 is disposed at an upper portion of the main frame 1, and a seat 20, on which a rider sits, is mounted on the rear frame 2.

The engine E of the present embodiment is an air-cooled single-cylinder engine. However, the type of the engine E is not limited thereto, and the engine E may be a water-cooled engine or may be a multi-cylinder engine such as a two-cylinder engine and a four-cylinder engine. The engine E includes a crankcase 22 which rotatably supports a crankshaft 21, a cylinder 24 which projects upward from the crankcase 22, and a cylinder head 26 which is connected to an upper portion of the cylinder 24. In the present embodiment, the crankshaft 21 extends in the motorcycle widthwise direction (right-left direction).

An intake system IS is connected to an intake port 26a in the rear surface of the cylinder head 26. The intake system IS takes in the outside air as intake air, sprays fuel into it so as to generate a fuel-air mixture, and supplies the fuel-air mixture to the engine E.

An exhaust pipe 28 is connected to an exhaust port 26b in the front surface of the cylinder head 26. The exhaust pipe 28 extends downward in an area in front of the engine E, bends rearward, extends rearward in an area below the right side of the engine E, and is connected to a muffler 30. The muffler 30 is disposed rearward of the engine E and on the right side of the rear wheel 16, and discharges exhaust gas G. The muffler 30 weakens the exhaust energy to reduce exhaust sound emitted to the outside. The exhaust pipe 28 and the muffler 30 cooperate together to form an exhaust device ED of the engine E.

The engine E is disposed between the front wheel and the rear wheel 16 in the front-rear direction or longitudinal direction of the motorcycle and below the fuel tank 18. In addition, the engine E is disposed frontward of the swing arm bracket 12. Since the engine E is disposed such that the exhaust port 26b faces frontward as described above, the engine E discharges exhaust gas toward the front side of the motorcycle.

The exhaust structure for the engine E of the present embodiment will be described. As described above, the exhaust pipe 28 is connected to the exhaust port 26b in the front surface of the engine E, and introduces the exhaust gas G to the muffler 30 disposed in rear of the exhaust pipe 28. Thus, the exhaust pipe 28 is formed so as to be bent in a substantially U shape. That is, the exhaust pipe 28 extends frontward from the exhaust port 26b, bends and extends downward in order to direct the flow of exhaust gas in the downward direction, and further bends and extends rearward in order to direct the flow of exhaust gas in the rearward direction. In other words, the exhaust pipe 28 bends downward from the frontward direction at a first curved portion 35 and bends rearward from the downward direction at a second curved portion 40.

Catalyst converters (catalyst units) 31 and 32 which purify certain harmful components contained in the exhaust gas G are provided in the process of introducing the exhaust gas G. Specifically, for the catalyst converters 31 and 32, a three-way catalyst that purifies specific components by an oxidation/reduction reaction of the exhaust gas G after combustion is used. The catalyst units 31 and 32 are accommodated in a catalyst pipe 34 which forms a part of the exhaust pipe 28. In the present embodiment, the catalyst pipe 34 has a curved cylindrical shape. The catalyst units 31 and 32 are disposed in the catalyst pipe 34 at an interval in the flow direction of exhaust gas. However, the number of catalyst units 31 and 32 may be one or may be three or more.

In the following description, the upstream side catalyst unit 31 is referred to as first catalyst unit 31, and the downstream side catalyst unit 32 is referred to as second catalyst unit 32. In addition, a portion, of the exhaust pipe 28, upstream of the first catalyst unit 31 is referred to as exhaust pipe upstream portion 36, and a portion, of the exhaust pipe 28, downstream of the second catalyst unit 32 is referred to as exhaust pipe downstream portion 38.

The exhaust gas G flows from the exhaust pipe upstream portion 36 into the catalyst pipe 34. That is, the exhaust pipe upstream portion 36 is connected at an upstream end portion thereof to the exhaust port 26b and is connected at a downstream end portion thereof to the catalyst pipe 34. Meanwhile, the exhaust gas G having passed through the catalyst pipe 34 flows through the exhaust pipe downstream portion 38 into the muffler 30. That is, the exhaust pipe downstream portion 38 provides communication between the catalyst pipe 34 and the muffler 30. In the present embodiment, the exhaust pipe downstream portion 38 extends straight in the rearward direction.

In the present embodiment, each of the catalyst units 31 and 32 is composed of a metal honeycomb catalyst having a catalyst substance retained on a honeycomb structure (catalyst carrier) made of metal. However, the catalyst units 31 and 32 are not limited to the metal honeycomb catalysts. Each of the catalyst units 31 and 32 is formed of a straight pipe (non-curved shape) having a center line extending in a straight manner. In the present embodiment, each of the catalyst units 31 and 32 is formed in a columnar shape. The lengths in the exhaust flow direction of the catalyst units 31 and 32 may be equal to each other or may be different from each other.

In the present embodiment, the catalyst pipe 34 bends via the second curved portion 40, and the catalyst units 31 and 32 are disposed on the upstream side and the downstream side, respectively, of the exhaust pipe 28 with the second curved portion 40 therebetween. Therefore, one catalyst unit 31 is disposed upstream of the second curved portion 40, and the other catalyst unit 32 is disposed downstream of the second curved portion 40. However, the catalyst pipe 34 may be a straight pipe having no second curved portion 40, or each of the catalyst units 31 and 32 may be disposed on one side (for example, upstream) of the second curved portion 40. The first catalyst unit 31 is disposed in front of a lower portion of the engine E.

Figure 2:
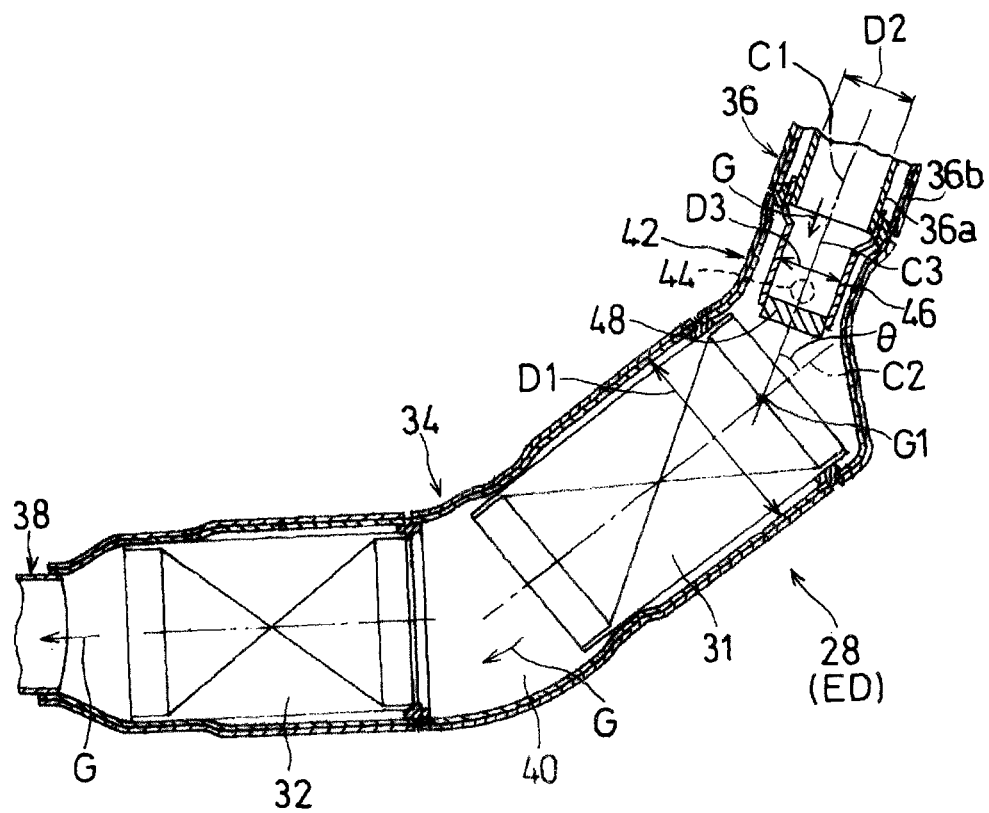
FIG. 2 is a longitudinal cross-sectional view showing the exhaust structure.

As shown in FIG. 2, the first catalyst unit 31 is formed such that the cross-sectional area thereof, that is, the passage area thereof, is larger than that of the exhaust pipe upstream portion 36. In other words, an inner diameter D1 of the catalyst pipe 34 is set so as to be larger than an inner diameter D2 of the exhaust pipe upstream portion 36. Preferably, the inner diameter D1 of the catalyst pipe 34 is equal to or larger than twice the inner diameter D2 of the exhaust pipe upstream portion 36 (D1≥D2×2). However, the inner diameter D1 of the catalyst pipe 34 may be set so as to be equal to or smaller than twice the inner diameter D2 of the exhaust pipe upstream portion 36 and larger than D2 (D2≤D1≤D2×2).

The exhaust pipe upstream portion 36 and the catalyst pipe 34, which have different outer diameters as described above, are connected to each other via a tapered pipe 42. The tapered pipe 42 is connected at an upstream end thereof to the exhaust pipe upstream portion 36, is connected at a downstream end thereof to the catalyst pipe 34, and has a passage area that gradually increases toward the downstream side.

In the present embodiment, the exhaust pipe upstream portion 36 is composed of a double pipe. Specifically, the double pipe is composed of an inner pipe 36a which is connected to the exhaust port 26b and through which exhaust gas flows, and an outer pipe 36b which is formed concentrically with the inner pipe 36a and which forms a space between the inner pipe 36a and the outer pipe 36b. The exhaust port 26b and the tapered pipe 42 are connected to each other by the double pipe. Exhaust gas passes through the interior of the inner pipe 36a and does not flow between the inner pipe 36a and the outer pipe 36b. That is, the inner diameter of the exhaust pipe upstream portion 36 corresponds to the inner diameter of the inner pipe 36a.

An exhaust gas sensor 44 for detecting a component in exhaust gas is provided upstream of the first catalyst unit 31 in the exhaust pipe 28. Specifically, the exhaust gas sensor 44 is provided on the tapered pipe 42. More specifically, the exhaust gas sensor 44 is provided at an inner portion, in the motorcycle widthwise direction, of the tapered pipe 42. In the present embodiment, an oxygen sensor is used as the exhaust gas sensor 44. With this configuration, it is possible to sufficiently bring exhaust gas from discharge holes 50 (hereinafter described) into contact with the exhaust gas sensor 44. Thus, the exhaust gas sensor 44 enables more accurate component detection.

Figure 3:
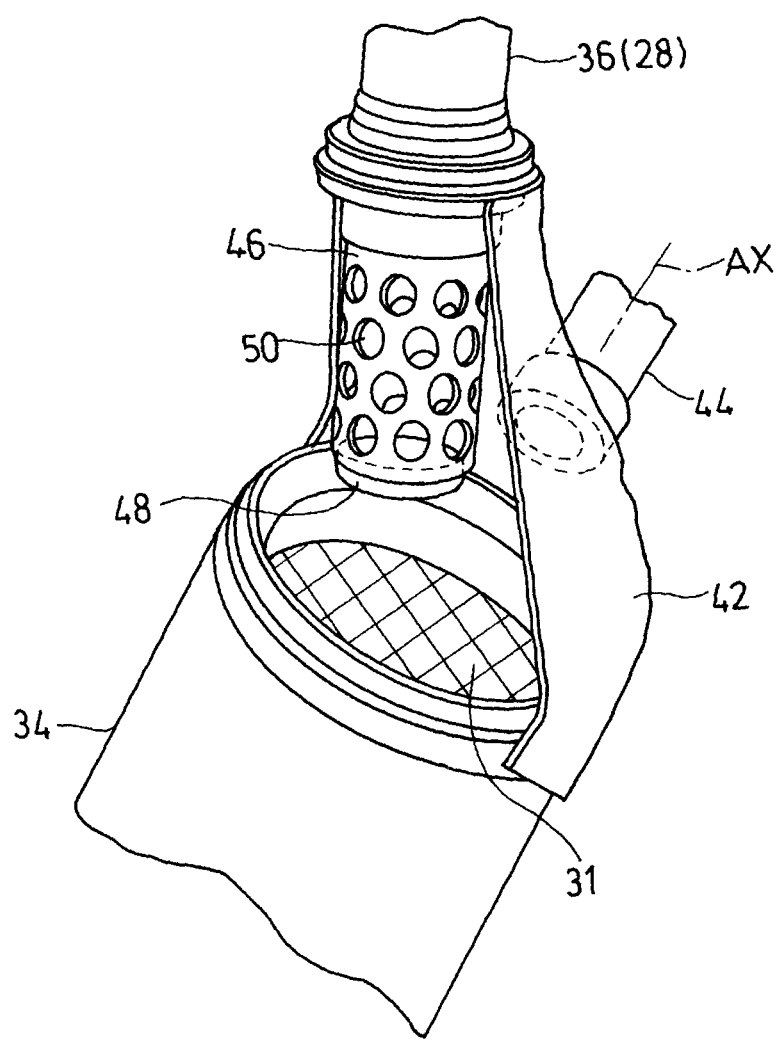
FIG. 3 is a partially cutaway perspective view showing a main part of the exhaust structure.

As shown in FIG. 3, the exhaust gas sensor 44 extends upward from the tapered pipe 42 so as to be inclined inward in the motorcycle widthwise direction. The exhaust gas sensor 44 has a cylindrical shape, and, in the present embodiment, an axis AX thereof has an acute angle of inclination toward the inner side in the motorcycle widthwise direction with respect to the outer circumferential surface of the tapered pipe 42.

As shown in FIG. 2, a center line C1 of the upstream end of the exhaust pipe upstream portion 36 is formed so as to be inclined relative to a center line C2 of the first catalyst unit 31. Specifically, the center line C1 of the upstream end of the exhaust pipe upstream portion 36 is inclined so as to extend rearwardly and downwardly. An inclination angle θ of the center line C1 of the upstream end of the exhaust pipe upstream portion 36 relative to the center line C2 of the first catalyst unit 31 is, for example, 30 to 40°.

In the present embodiment, an intersection point G1 at which the center line C1 of the upstream end of the exhaust pipe upstream portion 36 intersects the center line C2 of the first catalyst unit 31 is set on a honeycomb structure upstream end surface of the first catalyst unit 31 or in the vicinity thereof.

A lead-out pipe 46 is provided at the downstream end portion of the exhaust pipe upstream portion 36. The lead-out pipe 46 leads the exhaust gas G of the engine E to the catalyst pipe 34. The lead-out pipe 46 is, for example, a cylindrical pipe member. The lead-out pipe 46 is formed from a heat resistant material (for example, austenitic stainless steel SUS304). However, the material of the lead-out pipe 46 is not limited thereto.

Figure 4:
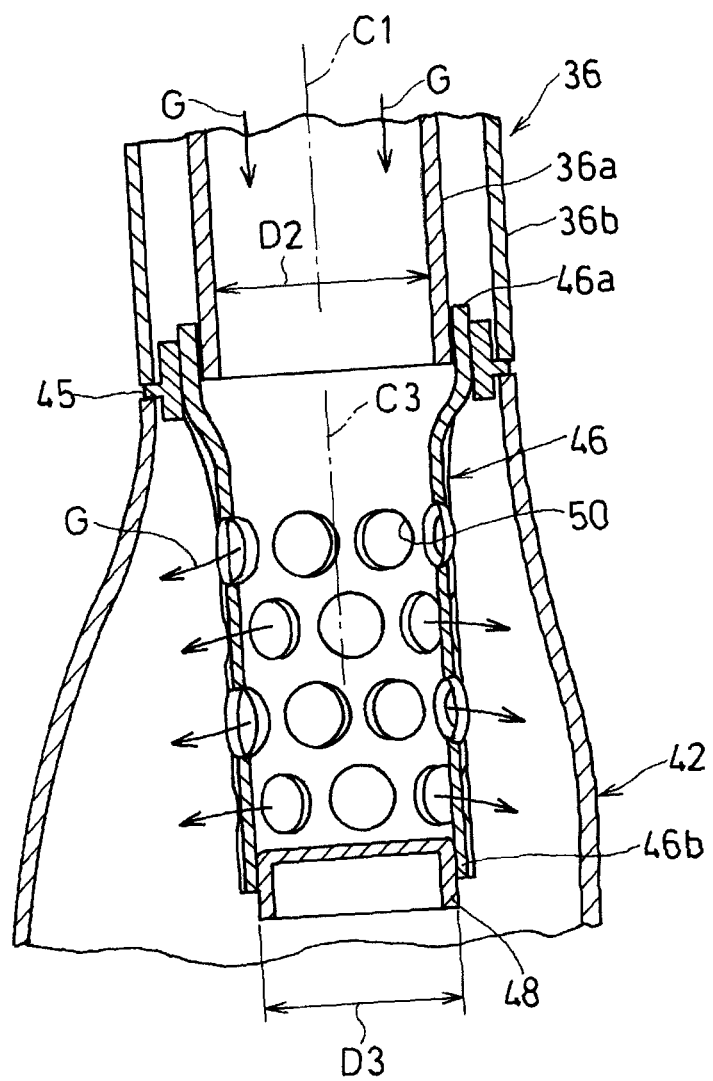
FIG. 4 is a cross-sectional view showing a main part of the exhaust structure.

As shown in FIG. 4, the inner circumferential surface of an upstream end portion 46a of the lead-out pipe 46 is welded to the outer circumferential surface of the downstream end of the inner pipe 36a of the exhaust pipe upstream portion 36 over the entire circumference. Moreover, an annular ring member 45 is welded to the outer circumferential surface of the upstream end portion 46a of the lead-out pipe 46, and the inner circumferential surface of a downstream end portion of the outer pipe 36b of the exhaust pipe upstream portion 36 and the inner circumferential surface of an upstream end portion of the tapered pipe 42 are fixed to the outer circumferential surface of the ring member 45 by welding. The connection structure of the lead-out pipe 46 is not limited thereto.

In the present embodiment, the inner diameter D2 of the exhaust pipe upstream portion 36 and an inner diameter D3 of the lead-out pipe 46 are set so as to be equal to each other. Therefore, the inner diameter D1 of the catalyst pipe 34 in FIG. 2 is set so as to be larger than the inner diameter D3 of the lead-out pipe 46. The inner diameter D1 of the catalyst pipe 34 is preferably equal to or larger than twice the inner diameter D3 of the lead-out pipe 46 (D1≥D3×2). However, the inner diameter D2 of the exhaust pipe upstream portion 36 and the inner diameter D3 of the lead-out pipe 46 may be different from each other.

In the present embodiment, an axis C3 of the lead-out pipe 46 coincides with an axis C1 of the downstream end of the exhaust pipe upstream portion 36. Therefore, the axis C3 of the lead-out pipe 46 is inclined relative to the center line C2 of the first catalyst unit 31. In other words, the axis C3 of the lead-out pipe 46 is inclined relative to an axis C2 of the inlet of the catalyst pipe 34. However, the axis C3 of the lead-out pipe 46 may not coincide with the axis C1 of the downstream end of the exhaust pipe upstream portion 36.

A downstream end portion 46b of the lead-out pipe 46 is closed. Specifically, a closing member 48 is fitted to the opening of the downstream end portion 46b of the lead-out pipe 46 shown in FIG. 4. The closing member 48 is fixed to the inner circumferential surface of the downstream end portion 46b of the lead-out pipe 46 by welding. That is, the exhaust gas G is not discharged from the downstream end portion 46b of the lead-out pipe 46. As for the shape of the closing member 48, a portion formed in a planar shape and a portion extending in the axial direction are provided. Thus, the closing member 48 can be firmly fixed to the lead-out pipe 46 by being welded to the circumferential surface of the lead-out pipe 46. As a result, the closing member 48 can be prevented from coming out of the lead-out pipe 46 due to reception of the exhaust pressure.

As shown in FIG. 3, a discharge hole 50 is formed in a peripheral wall 46c of the lead-out pipe 46. The discharge hole 50 is, for example, a circular punched hole, and a plurality of discharge holes 50 are formed in the peripheral wall 46c of the lead-out pipe 46. However, the shape of each discharge hole 50 may be a shape other than a circular shape, and the shapes of the respective discharge holes 50 may be different from each other. In the present embodiment, the discharge holes 50 are formed over the entire region in the circumferential direction of the peripheral wall 46c. The discharge holes 50 are also provided so as to be aligned in the axial direction of the peripheral wall 46c. In the present embodiment, the discharge holes 50 are provided in a staggered manner, and are formed to have the same size. However, the sizes of the discharge holes 50 may be different from each other.

The first curved portion 35 is provided upstream of the lead-out pipe 46 in the exhaust pipe 28 in FIG. 1. An opening area S1 of the discharge holes 50 on the outer side (front side) of curve of the first curved portion 35, that is, the total value of the respective discharge holes 50, is set so as to be smaller than an opening area S2 of the discharge holes 50 on the inner side (rear side) of curve of the first curved portion 35 (S1<S2). In the present embodiment, the respective discharge holes 50 are formed to have the same size, and the number of discharge holes 50 provided on the outer side of curve is larger than that on the inner side of curve. The opening area of each discharge hole 50 may be larger on the outer side of curve and smaller on the inner side of curve. The opening area S1 of the discharge holes 50 on the outer side of curve may be equal to the opening area S2 of the discharge holes 50 on the inner side of curve.

Figure 5:
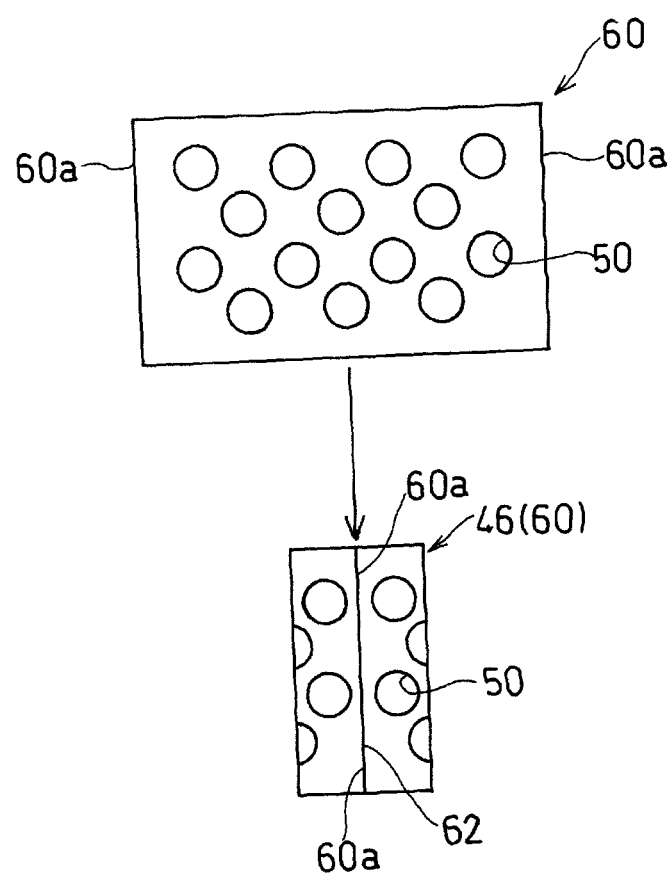
FIG. 5 is a development of a lead-out pipe of the exhaust structure.

As shown in FIG. 5, the lead-out pipe 46 of the present embodiment is formed by bending a steel plate 60 provided with punched holes (discharge holes 50) into a cylindrical shape, and joining both end edges 60a and 60a by welding. Punched holes are formed in the axial direction of the cylinder except for a joint region W. Accordingly, variations in welding quality in the axial direction are prevented. In other words, since no discharge hole 50 is provided at a seam 62 formed by the welding, the total value of the opening areas of the discharge holes 50 in the vicinity of the seam 62 is rendered to be small. In the present embodiment, by disposing the lead-out pipe 46 such that the seam 62 is located on the outer side (front side) of curve, the total opening area S1 of the discharge holes 50 on the outer side of curve is made smaller than the opening area S2 of the discharge holes 50 on the inner side of curve.

In the present embodiment, the sum St (=S1+S2) of the opening areas of the discharge holes shown in FIG. 3 is set so as to be larger than a closed outlet area S3 of the lead-out pipe 46 (St>S3). Preferably, the sum St of the opening areas of the discharge holes is equal to or larger than twice the outlet area S3 of the lead-out pipe 46 (St≥(2×S3)). The magnitude relationship between the sum St of the opening areas of the discharge holes 50 and the outlet area S3 of the lead-out pipe 46 is not limited thereto.

The flow of the exhaust gas G in the exhaust structure of the present embodiment will be described. When the engine E in FIG. 1 starts up, the exhaust gas G of the engine E is discharged to the exhaust pipe 28. Since the exhaust pipe upstream portion 36 has a smaller diameter than the catalyst pipe 34, the flow of the exhaust gas G in the exhaust pipe upstream portion 36 is fast.

As shown in FIG. 2, the exhaust gas G flows from the exhaust pipe upstream portion 36 into the lead-out pipe 46 and is discharged from the discharge holes 50 of the lead-out pipe 46. The exhaust gas G discharged from the discharge holes 50 (FIG. 3) is introduced through the tapered pipe 42 into the first catalyst unit 31. The exhaust gas G is purified when passing through the first catalyst unit 31.

The exhaust gas G having passed through the first catalyst unit 31 is introduced through the second curved portion 40 into the second catalyst unit 32. Since the exhaust gas G is straightened by the first catalyst unit 31, the exhaust gas G is evenly introduced into the second catalyst unit 32. The exhaust gas G is further purified when passing through the second catalyst unit 32.

The exhaust gas G discharged from the second catalyst unit 32 flows through the exhaust pipe downstream portion 38 into the muffler 30, is silenced by the muffler 30, and then, is discharged to the outside.

In the above configuration, the exhaust gas G is discharged from the discharge holes 50, which are formed in the peripheral wall 46c of the lead-out pipe 46 shown in FIG. 3, and is introduced into the catalyst pipe 34. Accordingly, the direction of the flow of the exhaust gas G is deflected from the axial direction of the lead-out pipe 46 to the radial direction of the lead-out pipe 46, and the exhaust gas G is dispersed and discharged from the plurality of discharge holes 50. Since the exhaust gas G diffuses in the lead-out pipe 46 as described above, the exhaust gas G can be prevented from being concentrated on a specific part of the first catalyst unit 31.

In the case where the closing member 48 is not provided and the exhaust gas G is discharged from the opening of the downstream end of the lead-out pipe 46, the exhaust gas G flows along the axial direction of the lead-out pipe 46. In the above-mentioned embodiment, the direction of the flow of the exhaust gas G is changed from the axial direction to the radial direction, and then, the exhaust gas G is dispersed in the circumferential direction, and the exhaust gas G flows along the tapered pipe 42 to change its flow direction again, so as to finally flow rearward. The direction of the flow is changed twice as described above. Since the tapered pipe 42 is provided, the exhaust gas G can also be introduced to the regions, on the outer side in the radial direction, of the upstream end surfaces of the first catalyst units 31 and 32.

In the present embodiment, since concentration of the exhaust gas G is avoided, deterioration of a specific part of the first catalyst unit 31 can be prevented. In addition, since the exhaust gas G is dispersed and introduced to the entirety of the upstream end of the first catalyst unit 31, the region of the first catalyst unit 31 that contacts the exhaust gas G can be increased, and the exhaust gas G can be efficiently purified, as compared to the case where the exhaust gas G is concentrated and introduced to a part of the upstream end. As a result, the amount of the catalyst retained can be reduced, and the catalyst material required to be retained can be reduced, resulting in a reduction in cost.

The discharge holes 50 shown in FIG. 3 are formed over the entire region in the circumferential direction of the peripheral wall 46c. Accordingly, since the exhaust gas G is discharged toward the radial direction of the lead-out pipe 46 from the entire region in the circumferential direction, uneven distribution of the exhaust gas G in the circumferential direction can be prevented. As a result, the exhaust gas G can be efficiently purified.

The axis C3 of the lead-out pipe 46 shown in FIG. 2 is inclined relative to the axis C1 of the first catalyst unit 31. Accordingly, as compared to the case where both axes C1 and C3 coincide with each other, the exhaust gas G can easily flow to the region on the outer side of curve, and therefore, the exhaust gas G can be brought into contact with a wider area of the upstream end surface of the first catalyst unit 31. As a result, the exhaust gas G can be efficiently purified.

Since the first curved portion 35 shown in FIG. 1 is provided in the exhaust pipe upstream portion 36 located upstream of the lead-out pipe 46, the exhaust gas G is apt to be distributed to the outer side (front side) of curve of the first curved portion 35 due to the centrifugal force. Specifically, the direction of the flow of the exhaust gas G is less likely to be changed due to inertia, and a large amount of the exhaust gas G is apt to flow to the outer side of curve. In the above configuration, the opening area S1 of the discharge holes 50 shown in FIG. 3 located on the outer side of curve of the first curved portion 35 is set so as to be smaller than the opening area S2 of the discharge holes 50 on the inner side of curve of the first curved portion 35. Accordingly, even in the case where the exhaust passage is curved due to the layout need of the exhaust passage, uneven distribution of the exhaust gas G due to the curve can be inhibited. As a result, the exhaust gas G can be efficiently purified. In addition, a difference between the opening area S1 and the opening area S2 is more easily achieved by changing the orientation (position in the circumferential direction) of the joint region W (FIG. 5), as compared to the case where the sizes of the discharge holes 50 are changed.

The inner diameter D1 of the catalyst pipe 34 shown in FIG. 2 is set so as to be larger than the inner diameter D2 of the exhaust pipe upstream portion 36. In the above configuration, since the exhaust gas G is discharged in the radial direction from the discharge holes 50 of the lead-out pipe 46 shown in FIG. 3, the high-speed exhaust gas G is prevented from being concentrated on a specific part of the first catalyst unit 31. Accordingly, the purification performance of the first catalyst unit 31 can be enhanced by increasing the size of the first catalyst unit 31, and the exhaust gas G can also be dispersed by the discharge holes 50, thereby efficiently using the first catalyst unit 31. In addition, the exhaust gas G discharged from the discharge holes 50 flows through a region having a larger passing area than the exhaust pipe upstream portion 36, and thus, the flow rate thereof is decreased. Since the flow rate is decreased as described above, deterioration of the first catalyst unit 31 can be further inhibited.

The sum St of the opening areas of the discharge holes 50 is set so as to be larger than the closed outlet area S3 of the closing member 48 of the lead-out pipe 46. Accordingly, the sufficiently large opening area St of the discharge holes 50 can be ensured, and therefore, the resistance when the exhaust gas G is discharged from the discharge holes 50 can be suppressed. As a result, a decrease in engine output due to obstruction of the flow of the exhaust gas G can be prevented.

The single-cylinder engine E has a larger exhaust pressure than a multi-cylinder engine. However, in the above configuration, since the exhaust gas G is dispersed by the discharge holes 50, the high-pressure exhaust gas G is not concentrated on a specific part of the first catalyst unit 31. Accordingly, deterioration and damage of a specific part of the first catalyst unit 31 can be prevented.

Since the lead-out pipe 46 is located at the upstream portion in the exhaust passage as shown in FIG. 2, the exhaust pressure is apt to be relatively large. In the above configuration, since the exhaust gas G is dispersed by the discharge holes 50 shown in FIG. 3, even when the pressure of the exhaust gas G passing through the lead-out pipe 46 is high, the exhaust gas G can be prevented from being concentrated on a specific part of the first catalyst unit 31. As a result thereof, and deterioration of a specific part of the first catalyst unit 31 can be prevented.

Figure 6:
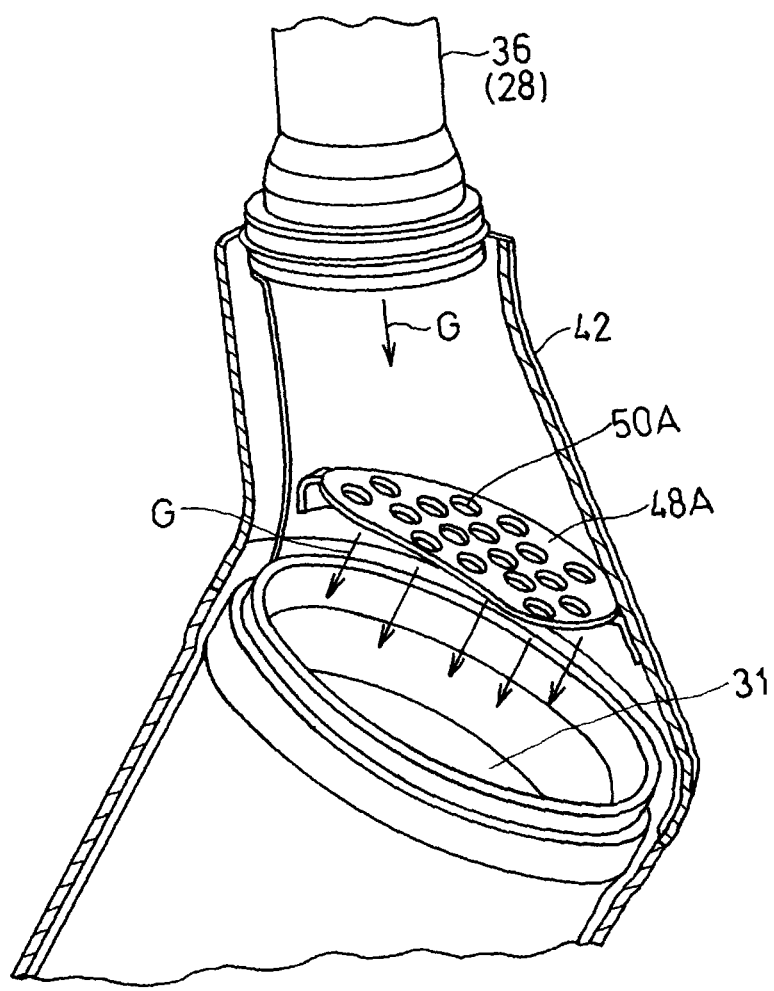
FIG. 6 is a partially cutaway perspective view showing an exhaust structure for an engine related to the present invention.

FIG. 6 shows an exhaust structure related to the present invention. In the example of FIG. 6, a closing member 48A is joined to the tapered pipe 42, instead of the lead-out pipe 46, by welding, and a plurality of discharge holes 50A are provided in the closing member 48A. In the modification of FIG. 6 as well, the exhaust gas G discharged from the exhaust pipe upstream portion 36 contacts the entire upstream end surface of the first catalyst unit 31 and is not concentrated on a specific part. Accordingly, deterioration of a specific part of the first catalyst unit 31 can be prevented.

In the above embodiment, since the first catalyst unit 31 is disposed in front of the front end of the engine E, specifically, adjacent to the curved portion thereof, the exhaust gas G having a relatively high temperature is introduced to the first catalyst unit 31. Accordingly, temperature rise of the first catalyst unit 31 can be promoted, and the purification performance at the start of the first catalyst unit 31 is improved. As described above, even when the first catalyst unit 31 is disposed relatively on the upstream side, deterioration of the first catalyst unit 31 can be prevented by dispersing the exhaust gas G as in the present invention. In the present embodiment, both improvement of the purification performance at the start and deterioration prevention can be achieved as described above.

Since the discharge holes 50 are provided so as to be aligned not only in the circumferential direction but also in the axial direction, the exhaust gas G can be dispersed not only in the circumferential direction but also in the axial direction. By dispersing the exhaust gas G three-dimensionally as described above, the dispersion effect can be enhanced. In addition, the effect of losing the energy of the exhaust gas G can also be expected to be exhibited by interference between the exhaust gas G discharged from the discharge holes 50 on the upstream side of the lead-out pipe 46 and flowing in the axial direction and the exhaust gas G discharged on the downstream side and flowing in the axial direction.

Since the exhaust pipe upstream portion 36 is composed of a double pipe so that a space is formed between the inner pipe 63a and the outside air, the exhaust gas G passing through the exhaust pipe upstream portion 36 can be inhibited from being cooled by the outside air. Therefore, the purification performance at the start can be improved.

The catalyst units 31 and 32 are each formed in a honeycomb shape having a plurality of passages extending in the axial direction. In the present embodiment, the exhaust gas G flowing into the upstream side first catalyst unit 31 of the two catalyst units 31 and 32 is dispersed in the radial direction and the circumferential direction. Accordingly, the exhaust gas G straightened by passing through the plurality of passages of the upstream side first catalyst unit 31 flows to the downstream side second catalyst unit 32. Therefore, the exhaust gas G is also dispersed and introduced to the second catalyst unit 32. Accordingly, not only the purification effect of the upstream side first catalyst unit 31 but also the purification effect of the downstream side second catalyst unit 32 can also be enhanced.

Moreover, a gap SP is formed between the upstream first catalyst unit 31 and the downstream second catalyst unit 32, and thus, the exhaust gas G is easily dispersed at the gap portion. Accordingly, the purification effect of the downstream second catalyst unit 32 can be further enhanced. In addition, in the present embodiment, the gap between the two catalyst units 31 and 32 is formed in a curved shape. Accordingly, dispersion of the exhaust gas G in the gap region is easily promoted. As a result, the exhaust gas G that has not contacted the catalyst in the upstream side first catalyst unit 31 can be easily brought into contact with the catalyst of the downstream side second catalyst unit 32. Accordingly, the purification effect can be further enhanced.

By dispersing and introducing the exhaust gas to the entire upstream end surface of the catalyst unit 31 as described above, the exhaust structure of the present embodiment not only can prevent deterioration of the catalyst unit 31, but also can reduce the cost of the catalyst unit 31. That is, by increasing the purification amount per unit area by increasing the catalyst region that contacts the exhaust gas G, the catalyst material required to be retained can be reduced. As a result, the cost of the catalyst unit 31 can be reduced.

The present invention is not limited to the above-described embodiment, and various additions, changes, or deletions can be made without departing from the gist of the present invention. For example, in the above embodiment, the exhaust pipe upstream portion 36 and the lead-out pipe 46 are formed as separate members and connected to each other. However, the exhaust pipe upstream portion 36 and the lead-out pipe 46 may be formed as a single pipe. In this case, the discharge holes 50 are provided in the downstream end portion of the exhaust pipe upstream portion 36 (lead-out pipe 46). In addition, the positions of the catalyst converters 31 and 32 are not limited to those in the above embodiment, and the catalyst converters 31 and 32 may be provided to the rear of the front end of the engine E. Moreover, the exhaust structure for the engine of the present invention is also applicable to a multi-cylinder engine. Although the motorcycle has been described in the above embodiment, the exhaust structure for the engine of the present invention is applicable to saddle riding vehicles other than a motorcycle, for example, a three-wheeled vehicle, a four-wheeled buggy, etc. Therefore, these are construed as included within the scope of the present invention.

REFERENCE NUMERALS

28 . . . exhaust pipe
31, 32 . . . catalyst converter
34 . . . catalyst pipe
46 . . . lead-out pipe
50 . . . discharge hole
E . . . engine
G . . . exhaust gas

What is claimed is:

1. An exhaust structure for an engine, comprising:
a catalyst converter configured to purify exhaust gas of the engine;
a catalyst pipe in which the catalyst converter is accommodated; and
a lead-out pipe configured to lead the exhaust gas to the catalyst pipe,
the lead-out pipe having a plurality of discharge holes formed in a peripheral wall thereof; and
a closing member which is fitted to an opening of a downstream end portion of the lead-out pipe and closes the downstream end portion of the lead-out pipe.

2. The exhaust structure for the engine as claimed in claim 1, wherein the discharge holes are formed over an entire region in a circumferential direction of the peripheral wall.

3. The exhaust structure for the engine as claimed in claim 1, wherein an axis of the lead-out pipe is inclined relative to an axis of the catalyst pipe.

4. The exhaust structure for the engine as claimed in claim 1, wherein
a curved portion is provided in the lead-out pipe or a pipe upstream of the lead-out pipe, and
an opening area of the discharge holes on an outer side of curve is set so as to smaller than an opening area of the discharge holes on an inner side of curve.

5. The exhaust structure for the engine as claimed in claim 1, wherein an inner diameter of the cylindrical catalyst pipe is set so as to be larger than an inner diameter of the lead-out pipe.

6. The exhaust structure for the engine as claimed in claim 1, wherein a sum of opening areas of the discharge holes is larger than a closed outlet area of the lead-out pipe.

7. The exhaust structure for the engine as claimed in claim 1, wherein the engine is a single-cylinder engine.

8. A saddle riding vehicle comprising the exhaust structure for the engine as claimed in claim 1, wherein
an exhaust pipe is connected to a front surface of the engine, and
the lead-out pipe is disposed in front of the engine.

9. The exhaust structure for the engine as claimed in claim 1, further comprising a second catalyst converter downstream of the catalyst converter,
wherein an axis of the second catalyst converter is inclined relative to an axis of the first catalyst converter.

* * * * *